C. C. KEESLER AND F. A. CLOCK.
FIFTH WHEEL CONSTRUCTION.
APPLICATION FILED MAR. 23, 1918.

1,397,688.

Patented Nov. 22, 1921.

INVENTORS
Clyde C. Keesler
Fred A. Clock
BY
Parsons & Bodell
ATTORNEYS

C. C. KEESLER AND F. A. CLOCK.
FIFTH WHEEL CONSTRUCTION.
APPLICATION FILED MAR. 23, 1918.

1,397,688.

Patented Nov. 22, 1921.
2 SHEETS—SHEET 2.

INVENTORS
Clyde C. Keesler
Fred A. Clock
BY
Parsons & Bodell
ATTORNEYS

UNITED STATES PATENT OFFICE.

CLYDE C. KEESLER AND FRED A. CLOCK, OF CANASTOTA, NEW YORK, ASSIGNORS TO WATSON WAGON COMPANY, OF CANASTOTA, NEW YORK, A CORPORATION OF NEW YORK.

FIFTH-WHEEL CONSTRUCTION.

1,397,688.     Specification of Letters Patent.     Patented Nov. 22, 1921.

Application filed March 23, 1918. Serial No. 224,215.

*To all whom it may concern:*

Be it known that we, CLYDE C. KEESLER and FRED A. CLOCK, citizens of the United States, and residents of Canastota, in the county of Madison and State of New York, have invented a certain new and useful Fifth-Wheel Construction, of which the following is a specification.

This invention relates to fifth wheels particularly applicable for connecting motor vehicles, trucks or tractors and trailers, and it consists in a particularly simple and efficient means for normally preventing the separation of the fifth wheel sections. The invention consists in the novel features and in the combinations and constructions hereinafter set forth and claimed.

In describing this invention, reference is had to the accompanying drawings, in which like characters designate corresponding parts in all of the views.

Figure 1:
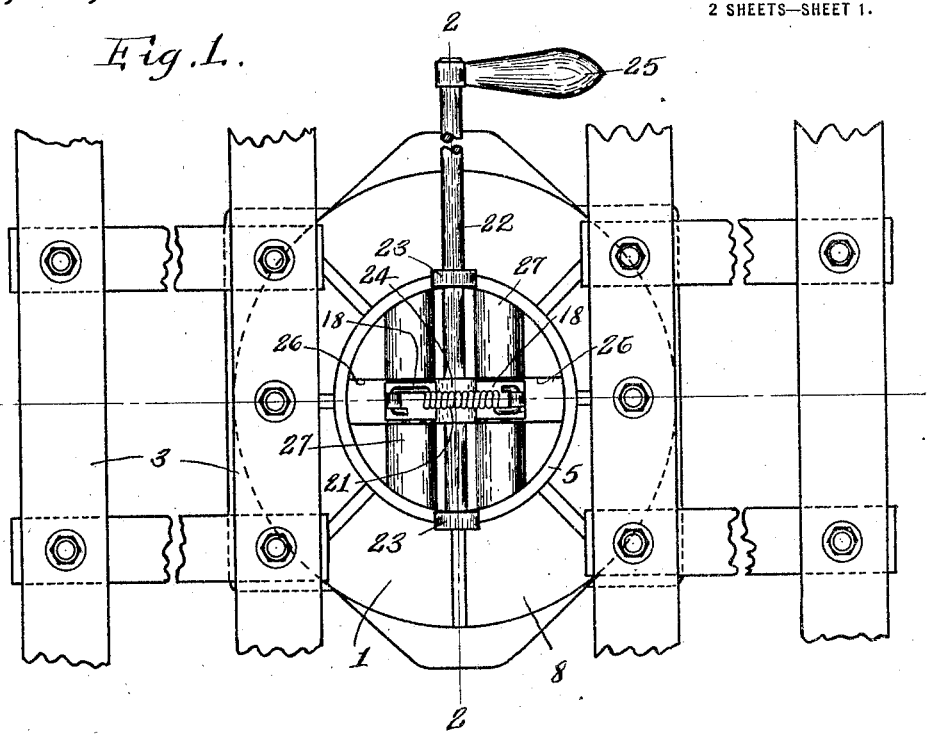
Figure 1 is a plan view of our fifth wheel, contiguous parts of the frame of the trailer being shown.

This fifth wheel comprises, generally, inner and outer sections, means for normally locking the sections from separation in an axial direction and means for operating the locking means at will to permit separation of the sections and hence detachment of the trailer from the tractor or truck.

1 and 2 are respectively, the inner and outer sections of the fifth wheel, the inner section being connected to the frame bars 3 of the trailer and the outer section being associated with the frame 4 of the tractor.

The section 1 is hollow and as here shown consists of a cylindrical upper portion 5 having a bottom 6 formed with a conoidal under surface 6ª, and a depending tubular stem 7. The upper cylindrical portion 5 is provided with a flat annular flange 8 which is secured to the frame of the trailer in any suitable manner. The outer section 2 is formed with a cavity complemental to the inner section and terminates at its lower end in a tubular stem 9 surrounding the stem 7. The stem 7 extends below the end of the stem 9. The conoidal bottom 10 of the cylindrical portion of the outer section 2 is of a greater angle than that of the conoidal surface 6ª of the inner section 1 to form a clearance between the sections at this point.

Figure 4:
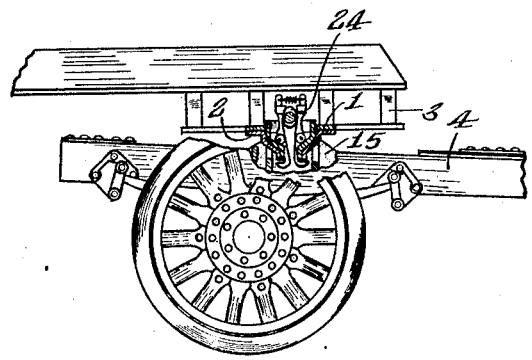
Fig. 4 is a fragmentary view illustrating the fifth wheel in section and the contiguous portions of the tractor and trailer.

The outer section is also formed with a flat annular flange 11 on which the flange 8 of the inner section bears. The outer section is also formed with horizontal pivot bearings 12 located at the margin of the annular flange 11 and alined with bearings 14 provided on webs 15 on the tractor frame, the bearings 12 and 14 receiving shafts or pivots 16 about which the truck frame 4 moves, as shown in Fig. 4, during the movement of the tractor or trailer over uneven ground. In other words, the pivot 16 permits a pivotal movement of the tractor frame and the trailer frame relatively to each other about a transverse horizontal axis. The means for locking the fifth wheel sections from separation in any axial direction, is carried by one of the sections and coacts with the other, and as here shown, this means comprises a pair of spring-pressed latches 18 pivoted between their ends on horizontal axes 19 within the inner section and extending lengthwise of the inner section on opposite sides of the vertical axis thereof, the latches 18 being provided with hook-shaped lower ends 20 which extend through slots 20ª in the stem 7 and under the end of the stem 9 of the outer section in position to prevent axial displacement of the inner section relatively to the outer. The latches are normally held in their operative position by means of a spring 21 connecting their upper ends.

The means for operating the latches 18 is preferably carried by the inner section, and preferably comprises a rock shaft 22 journaled in suitable lugs 23 on the upper side of the inner section 1, the rock shaft extending transversely of the axis of the fifth wheel and between the upper arms of the latches 18 and having a double cam 24 for coacting with the upper arms of the latches to separate said arms and hence draw in the lower ends 19 thereof within the stem 9 of the outer section 2 so that the sections 1, 2, may separate in an axial direction.

Figure 2:
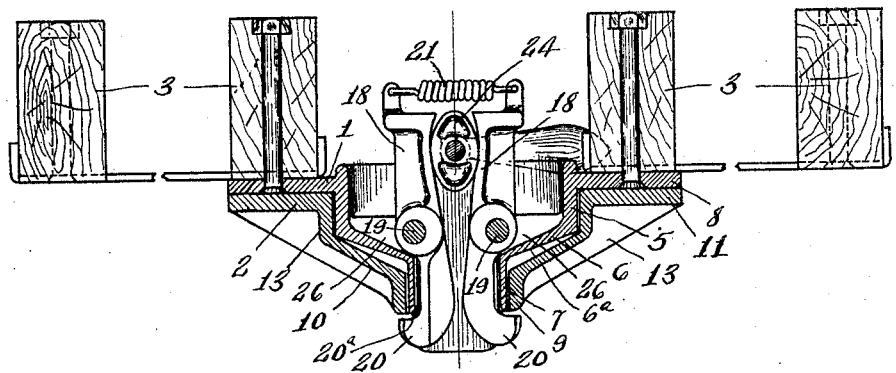
Fig. 2 is a sectional view on line 2—2, Fig. 1.
Figure 3:
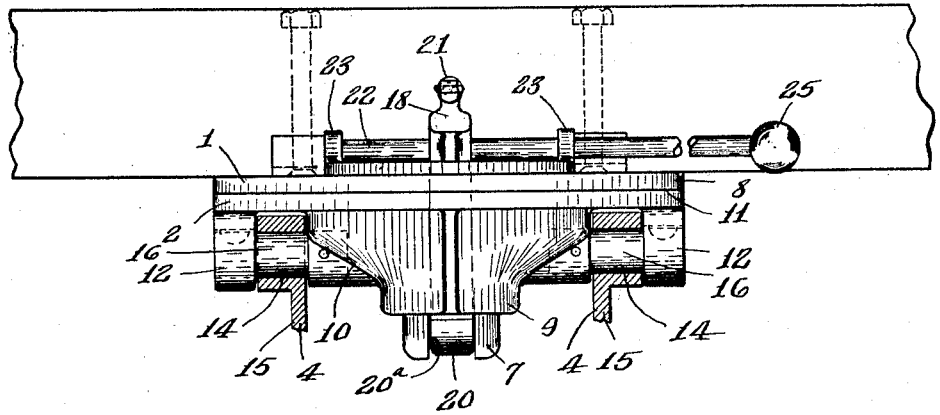
Fig. 3 is a front elevation of this fifth wheel.

The rock shaft is formed with a suitable handle 25 which is weighted and arranged to tend to turn the rock shaft into the position shown in Figs. 1 and 2, in which the latches are in their operative position, so that if the operator, after coupling the trailer to the tractor, does not operate the rock shaft to move the latches into operative position, said shaft will be moved into its normal position by the jar of the tractor when moving over the ground and in so doing will permit the latches 18 to move into their operative position. The pivots for the latches 18 are located in radial slots 26 in the bottom of the cylindrical member 5 of the inner member and the bearings 27 for said pivots project slightly above the flat bottom surface of the said portion 5.

In operation, when it is desired to couple a trailer to a tractor, the tractor is backed under the front end of the trailer until the fifth wheel sections are in alinement and the front end of the trailer lowered, the latches, ratcheting into operative position, as they pass beyond the end of the stem 9 of the outer fifth wheel section 2. When the trailer has been drawn to its destination and the tractor is to be disconnected therefrom, the handle 25 is operated to turn the rock shaft 22 to cause the cam 24 to separate the upper arms of the latches 18 and withdraw the hook-shaped ends 20 out from under the edge surfaces of the stem 9 of the outer fifth wheel section 2. The front end of the trailer is then raised slightly to lift the inner fifth wheel section 1 out of the outer section 2. The trailers are usually provided with legs for supporting the front ends thereof when not connected to the tractor and these legs comprise jacks to lift the front end of the trailer.

What we claim is:

1. A fifth wheel comprising inner and outer sections, a locking member carried within the inner section and coacting with the outer section, to prevent separation of the sections in an axial direction, and means for operating the locking member comprising a rock shaft carried by the inner section and having means coacting with the locking member, the locking member extending lengthwise of the axis of the fifth wheel, and the rock shaft extending transversely of said axis, substantially as and for the purpose set forth.

2. A fifth wheel comprising inner and outer sections, a pair of locking members extending lengthwise of the inner section on opposite sides of the axis thereof and having parts extending beyond the periphery of the inner section into position to coact with the outer section to prevent displacement of the sections in an axial direction, and operating means carried by the inner section and extending between the locking members, substantially as and for the purpose described.

3. A fifth wheel comprising inner and outer sections, a pair of locking members extending lengthwise of the inner section on opposite sides of the vertical axis thereof and having parts extending beyond the periphery of the inner section into position to coact with the outer section to prevent displacement of the sections in an axial direction, and a rock shaft carried by the inner section and extending transversely of the axis thereof between the locking members and having a cam thereon coacting with the locking members, substantially as and for the purpose specified.

In testimony whereof we have hereunto signed our names, at Canastota, in the county of Madison, and State of New York, this 21st day of February, 1918.

CLYDE C. KEESLER.
FRED A. CLOCK.